United States Patent
Kowada et al.

(10) Patent No.: US 7,502,141 B2
(45) Date of Patent: Mar. 10, 2009

(54) IMAGE FORMING DEVICE WITH GROUND-TINT DETECTION, IMAGE INVALIDATION, AND READ RESOLUTION SETTING

(75) Inventors: Takeshi Kowada, Saitama (JP); Shiho Toyonori, Tokyo (JP); Nobuaki Tomidokoro, Kanagawa (JP); Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 645 days.

(21) Appl. No.: 11/289,490

(22) Filed: Nov. 30, 2005

(65) Prior Publication Data

US 2006/0139698 A1 Jun. 29, 2006

(30) Foreign Application Priority Data

Dec. 2, 2004 (JP) ............................. 2004-350096
Nov. 24, 2005 (JP) ............................. 2005-338560

(51) Int. Cl.
*H04N 1/40* (2006.01)
*G06K 9/80* (2006.01)

(52) U.S. Cl. ................ 358/1.9; 358/3.28; 358/1.14

(58) Field of Classification Search ............... 358/1.9, 358/2.1, 3.24, 3.28, 1.14, 1.2, 1.6, 501, 530, 358/401, 448, 468, 437; 382/100, 135, 137, 382/181, 217, 218; 399/366; 340/5.86; 356/71; 283/901, 902

See application file for complete search history.

(56) References Cited

U.S. PATENT DOCUMENTS 5,418,602 A * 5/1995 Nishikawa ................ 399/366
5,440,409 A * 8/1995 Sugano et al. .............. 358/501
5,444,518 A * 8/1995 Hashiguchi et al. ......... 358/501
7,131,775 B2 * 11/2006 Uchida et al. ................ 400/62
7,168,868 B2 * 1/2007 Uchida et al. .............. 358/3.28
2004/0252347 A1 * 12/2004 Hosoya et al. ............. 358/3.28
2005/0088701 A1 * 4/2005 Uchida et al. ............. 358/3.28
2005/0174596 A1 * 8/2005 Uchida et al. .............. 358/1.14
2006/0126097 A1 * 6/2006 Toyonori et al. ........... 358/1.14
2006/0147236 A1 * 7/2006 Uchida et al. ................ 400/62
2006/0197980 A1 * 9/2006 Kanbara .................... 358/1.15
2006/0228045 A1 * 10/2006 Sakai ........................ 382/294
2007/0003341 A1 * 1/2007 Guan et al. ................. 399/366
2007/0247652 A1 * 10/2007 Akahori .................... 358/1.13

FOREIGN PATENT DOCUMENTS

| JP | 6-125459 | | 5/1994 |
|---|---|---|---|
| JP | 2004-200897 | | 7/2004 |
| JP | 2005192254 A | * | 7/2005 |
| JP | 2006121763 A | * | 5/2006 |
| JP | 2007124318 A | * | 5/2007 |
| JP | 2007251634 A | * | 9/2007 |

* cited by examiner

*Primary Examiner*—Scott A Rogers
(74) *Attorney, Agent, or Firm*—Oblon, Spivak, McClelland, Maier & Neustadt, P.C.

(57) ABSTRACT

In an image forming device, a ground-tint detection unit detects a ground-tint pattern in an original image based on image data output from an image reader unit. An image invalidation unit outputs a processed image data that makes the image data of the original image illegible, when the ground-tint pattern in the original image is detected. A resolution setting unit allows a resolution of the image reader unit to be higher than a minimum resolution needed for detection of a ground-tint pattern and stored in a memory unit.

8 Claims, 13 Drawing Sheets

FIG.13

INSERT YOUR ADMINISTRATOR ID

_____

INSERT YOUR AUTHENTICATION CODE
AND PRESS "OK" BUTTON

| AUTHENTICATION CODE | ADMINISTRATOR ID |
|---|---|
| 123456 | 0001 |
| 234567 | 0002 |
| 345678 | 0003 |
| ⋮ | ⋮ |
| ⋮ | ⋮ |
| 987654 | 9999 |

IMAGE FORMING DEVICE WITH GROUND-TINT DETECTION, IMAGE INVALIDATION, AND READ RESOLUTION SETTING

BACKGROUND OF THE INVENTION

1. Field of the Invention

The present invention generally relates to an image forming device, and more particularly to an image forming device having an image reader unit to read an original image and output image data therefrom, and a ground-tint detection unit to detect a ground-tint pattern in the original image based on the image data.

2. Description of the Related Art

In recent years, with improvements in image-processing and image-forming technology, it becomes possible to carry out even the image formation of a bill (bank note) using a color copier and distinguishing a copied bill from the real bill is difficult to the human eyes.

For this reason, in order to prevent illegal reproduction of special originals or confidential documents using copiers, various preventive measures have been proposed.

One method of distinguishing a special original or the like is to compare an input image data with a registered specific mark (or pattern data) by using the pattern matching method. If the specific mark is detected in the input image data, it is determined that the original is a special original with the specific mark provided to inhibit the copying of the original image.

On the other hand, also in the case of normal originals other than special originals, such as bills or securities, in the offices of companies or the like, there are many documents the copy inhibition of which is demanded from the viewpoint of the significance and security protection of the contents of such documents. Generally, the "secret" stamp or "copy inhibition" stamp is affixed to the documents the copy inhibition of which is demanded, in order to distinguish the special originals from the normal documents which can usually be copied.

Moreover, a copy inhibition method for which a ground-tint pattern is embedded in the background of a document is also proposed. This method is to create a ground-tint pattern which has a base region and a message region in the background of a paper document, which allows one of the two regions to be easily copied using the copying machine, and makes it difficult to reproduce the other of the two regions. When the document with the ground-tint pattern is copied, the message region appears on the image of the document.

For example, by making the message region contain the characters "copying inhibited", the characters "copying inhibited" can be reproduced at the time of outputting the copy.

Japanese Laid-Open Patent Application No. 06-125459 discloses a copying machine with a special original discrimination unit. The special original discrimination unit comprises a memory unit, a marking unit, an image extraction unit, a comparison unit, and a control unit.

The memory unit is provided to store feature data according to the kind of special originals, such as bills or negotiable securities, the copying of which is inhibited. The marking unit performs a predetermined marking on a recording sheet. The image extraction unit extracts a feature image portion from the input image data. The comparison unit compares the feature image portion extracted by the image extraction unit, with the feature data of the memory unit to determine a similarity of the input image data. The control unit inhibits the copy operation when the similarity determined by the comparison unit is above a predetermined first similarity. The control unit controls the marking unit to perform the marking on the recording sheet when the similarity is below the first similarity and above a predetermined second similarity.

According to the copying machine with the above-mentioned special original distinction function, it is possible to inhibit the copying of the special original and prevent illegal copying thereof, without barring the copying of the normal original.

Japanese Laid-Open Patent Application No. 2004-200897 discloses an image processing device comprising an image reader unit, a discriminating unit, a connecting unit, and a control unit. The image reader unit is provided to read an original image. The discriminating unit extracts a ground-tint pattern from the image data output from the image reader unit, compares the ground-tint pattern with a reference ground-tint pattern, and determines whether the original image contains the image data with which transmission of the image data to an external device or printing of the image data to a recording sheet is inhibited. The connecting unit is provided to control connection of the discriminating unit and the external device. The control unit is provided to control the respective units of the image processing device.

In the copying machine with the special original distinction function of Japanese Laid-Open Patent Application No. 06-125459 and the image processing device of Japanese Laid-Open Patent Application No. 2004-200897, the determination as to whether the original read by the image reader unit is a special original is made depending on the number of black dots or the distribution of black dots etc which exist in the reference area used as the reference.

However, the number of the black dots which existing in the reference area varies with the reading resolution used when the original image is read. Moreover, if minute ground-tint patterns are formed on the original read by the image reader unit and a reading resolution needed for the image reader unit to detect such ground-tint patterns correctly is not used, it is difficult to recognize the ground-tint patterns in the special original and it is difficult to prevent the outputting of the image data of the special original.

SUMMARY OF THE INVENTION

An object of the present invention is to provide an improved image forming device in which the above-described problems are eliminated.

Another object of the present invention is to provide an image forming device which allows the image reader unit to read a special original containing a ground-tint pattern at a resolution higher than a given resolution needed for ground-tint detection, and can prevent the outputting of image data of the special original by detecting the ground-tint pattern in the original image reliably.

In order to achieve the above-mentioned objects, the present invention provides an image forming device comprising: an image reader unit reading an original image to output image data of the original image; a ground-tint detection unit detecting a ground-tint pattern in the original image based on the image data output from the image reader unit, the ground-tint pattern being provided to inhibit outputting of the image data of the original image; a memory unit in which a minimum resolution that is needed for detection of a ground-tint pattern by the detection unit is stored; an image invalidation unit outputting a processed image data that makes the image data of the original image illegible, when the ground-tint pattern in the original image is detected; and a resolution setting unit storing the minimum resolution into the memory unit and allowing a resolution of the image reader unit at which the original image is read, to be higher than the minimum resolution stored in the memory unit.

According to the image forming device of the present invention, the image reader unit is allowed to read a special original containing a ground-tint pattern therein at a resolution high than the minimum resolution needed for ground-tint detection. And illegal outputting of image data of a special original can be prevented by detecting the ground-tint pattern in the original image safely.

Moreover, according to the image forming device, when an application program the image formation function of which does not work normally at the stored resolution of a RAM is detected, only the identification data of application programs with valid functions, other than the detected application program with invalid function, are registered in the RAM. Accordingly, illegal outputting of image data of a special original can be prevented more effectively.

Moreover, only an administrator or user of the image forming device is permitted to alter ON/OFF setting of the ground-tint detection unit, and it is possible to prevent alteration of the original setting of the detection processing of the ground tint detection unit by the third party.

BRIEF DESCRIPTION OF THE DRAWINGS

Other objects, features and advantages of the present invention will be apparent from the following detailed description when reading in conjunction with the accompanying drawings.

FIG. 13 is a diagram showing an example of the administrator information input request screen displayed on the display device of the image forming device in an embodiment of the invention.

FIG. 14 is a diagram showing an example of the authentication code and the administrator ID stored in RAM.

DETAILED DESCRIPTION OF PREFERRED EMBODIMENTS

A description will now be given of an embodiment of the invention with reference to the accompanying drawings.

Figure 6:
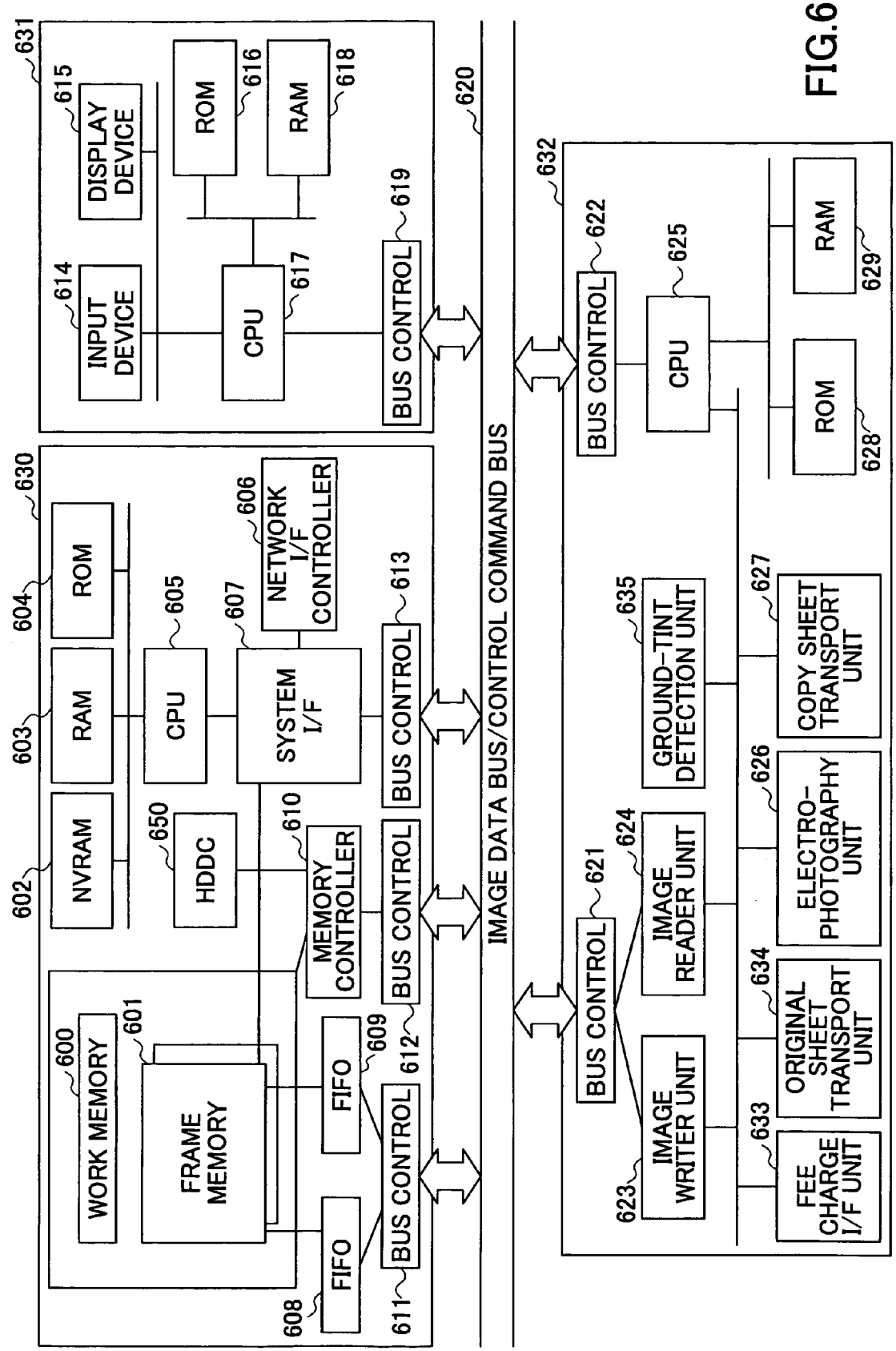
FIG. 6 is a block diagram showing the composition of the image forming device in an embodiment of the invention.

FIG. 6 shows the composition of an image forming device in an embodiment of the invention. The image forming device of this embodiment is a multi-function peripheral which comprises a system control unit 630, an operation panel unit 631, and an image input/output unit 632.

The system control unit 630, the operation panel unit 631, and the image input/output unit 632 are interconnected by the image data bus/control command bus 620.

The system control unit 630 is provided with multiple image formation functions, such as scanner application, copy application, facsimile application, and printer application, and controls operation of the whole image forming device. The system control unit 630 comprises a work memory 600, a frame memory 601, a NV-RAM 602, a RAM 603, a ROM 604, a CPU 605, a network I/F controller 606, a system I/F 607, a FIFO buffer 608, a FIFO buffer 609, a memory controller 610, bus control units 611, 612, 613, and a HDDC 650.

The CPU 605 controls the processing of the system control unit 630. A control program of the system control unit 630 is stored in the ROM 604. The RAM 603 is a work memory which is used by the CPU 605. The NVRAM 602 is a non-volatile memory which holds the system information of the system control unit 630. The network I/F controller 606 controls connection between the image forming device and a network.

The system I/F 607 controls the transmission of image data, such as facsimile data and printer data, which are processed by a command output from the CPU 605 within the system. The work memory 600 is a work memory which is used for image expansion used by the printer application. The frame memory 601 is a work memory which stores the image data of images read by the image reader unit or written by the image writer unit. The image data is an encoded dot image data.

The FIFO buffer 609 adjusts the transfer rate of data at the time of writing the input image data to the frame memory 601. Similarly, the FIFO buffer 608 adjusts the transfer rate of data at the time of transmitting the image data of the frame memory 601 to the image input/output unit 632 as the output image.

The memory controller 610 is not based on the control of the CPU 605 and controls the input and output of image data to and from the frame memory 601 and the HDDC 650 through the image data bus/control command bus 620.

The HDDC (hard disk drive controller) has a HDD (hard disk drive) inside and controls the input and output of image data to and from the HDD. The image data output from the image reader unit 624 or the image data obtained from the network is stored into the HDD.

The operation panel unit 631 controls the operation panel (LCD) which displays the settings and states of operation of the image forming device. The operation panel unit 631 comprises an input device 614, a display device 615, a ROM 616, a CPU 617, a RAM 618, and a bus control 619.

The CPU 617 controls the processing of the operation panel control unit 631. The control program to control the processing of the operation panel control unit 631 is stored in the ROM 616. The RAM 618 is the work memory which is used by the CPU 617. The input device 614 is a device on which the user inputs the system setting request. The display device 615 is a device which displays the operational information which notifies the user of the system settings and states of the image forming device.

The image input/output unit 632 performs the reading of an original image and the printing of a processed image to the copy sheet using the known electrophotographic process. The image input/output unit 632 comprises a bus control 621, a bus control 622, an image writer unit 623, an image reader unit 624, a CPU 625, an electrophotography unit 626, a copy sheet transport unit 627, a RAM 628, a ROM 629, a fee charge device I/F unit 633, an original sheet transport unit 634, and a ground tint detection unit 635.

The image data bus/control command bus 620 is a bus through which the image data and the control command are transmitted through the time-division scheme.

The CPU 625 controls the processing of the image input/output unit 632. A control program to control the processing of the image input/output unit 632 is stored in the ROM 629. The RAM 628 is the work memory which is used by the CPU 625.

The image writer unit 623 employs a known optical writer unit. The image writer unit 623 turns ON a laser light source to emit a laser beam at the pixel frequency in accordance with the input image data received from another unit of the image input/output unit 632 (e.g., the CPU 625). The laser beam from the light source is scanned over the photoconductor with the polygon scanner, so that an electrostatic latent image is formed on the photoconductor.

The image reader unit 624 employs a known optical scanner which reads the lamp light reflected from the original document using the CCD (charge-coupled device). The image reader unit 624 performs an image processing and separates a visible or invisible identifier from the image data. The identifier separated from the image data is encoded by the CPU 625, and the coded identifier is sent to the system control unit 630. The system control unit 630 specifies the image processing device or the computer which exists on the network by the coded identifier.

The original sheet transport unit 634 transports one original sheet, separated from a plurality of original sheets placed on the contact glass, to the image reader unit 624 one by one so that the original image is read by the image reader unit 624. The original sheet transport unit 634 detects the size of the original sheet.

The electrophotography unit 626 uses a known electrophotographic process, and converts the electrostatic latent image formed on the photoconductor by the image writer unit 623 into a visible image with toner, transfers the toner image to a copy sheet, and fixes the toner image to the copy sheet.

The copy sheet transport unit 627 transports the copy sheet to which the image will be transferred by the electrophotography unit 626, to the print position near the electrophotography unit 626, and transports the copy sheet on which the image was formed by the electrophotography unit 626, to the ejection position outside the image forming device.

The fee charging device I/F 633 connects the image input/output unit 632 to the fee charging device. The fee charging device I/F 633 converts the instruction from the CPU 625 into a command signal, transmits the command signal to the I/F of the fee charging device, and receives the printing conditions, the charged fee and the print permission signal from the fee charging device.

The ground tint detection unit 635 detects a ground-tint pattern in an original image. The image reader unit 624 reads the original document and outputs binary image data, and the binary image data is transmitted from the image reader unit 624 to the ground tint detection unit 635. The ground tint detection unit 635 transmits the result of detection of the ground-tint pattern to the CPU 605 of the system control unit 630.

When the result of detection by the ground tint detection unit 635 indicates that the original image is a special original containing a ground-tint pattern, the CPU 625 controls the image input/output unit 632 according to the instruction from the CPU 605, so that the elements (pixels) of the image data outputted from the image reader unit 624 are fixed to a predetermined gradation and a predetermined phase. Then, the processed image data that makes the contents of the original image illegible is transmitted to the image writer unit 623.

On the other hand, when the result of detection by the ground tint detection unit 635 indicates that the original image is the normal original which does not contain any ground-tint pattern, the CPU 625 controls the image input/output unit 632 according to the instruction from the CPU 605, so that the image data output from the image reader unit 624 is transmitted to the image writer unit 623 without changing the image data.

Figure 4:
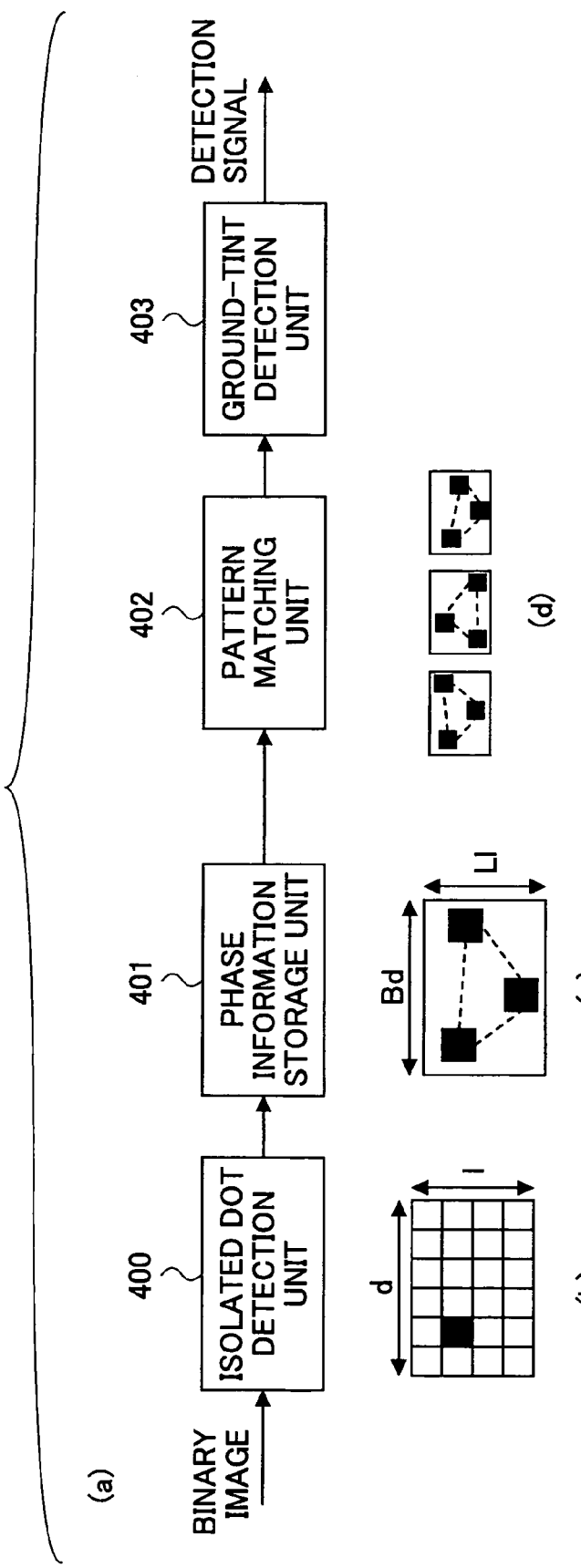
FIG. 4 is a block diagram showing the composition of a ground tint detection unit.

Next, detection processing of the ground-tint pattern by the ground tint detection unit 635 will be explained with reference to FIG. 4.

A ground-tint pattern has the feature in arrangement of dots, and it is a line drawing in which dots are continuously formed. For example, a ground-tint pattern is represented by repetition of a group of dots in a dispersing, grid-like, or graphic configuration, and the dots are uniformly formed in the background region of the original image of a document (or line drawing). That is, it is uniformly formed in the area except the characters and line drawing area of the original, (the area being left in white when the original is a blank document).

As for the dot pattern of the ground tint in an embodiment of the invention, it is necessary that the dot pattern of the ground tint be constituted by the dots each having a size that can be detected by the ground tint detection unit 635. That is, whether the ground-tint pattern of an original image can be copied depends on whether the binary image data transmitted from the image reader unit 624 to the ground tint detection unit 635 is constituted by the dots each having a size that can be detected by the ground tint detection unit 635.

The size of the dots that can be detected by the ground tint detection unit 635 is determined by a reading resolution at which the image reader unit 624 reads an original document. In order to recognize the dots of a ground-tint pattern correctly, a certain high resolution is needed with respect to the size of the dots formed on the original document.

In this embodiment, a predetermined minimum resolution which is needed for the ground-tint detection unit 635 to detect a ground-tint pattern in an original image is set up and stored in the RAM 603 at the time of the system startup. When the detection of a ground-tint pattern is performed by the ground tint detection unit 635, the CPU 605 controls the image reader unit 624 to read the stored resolution from the RAM 603 and perform the reading of the original image based on the read resolution.

As shown in FIG. 4(a), the ground tint detection unit in this embodiment comprises an isolated dot detection unit 400, a phase information storage unit 401, a pattern matching unit 402, and a ground tint detection unit 403.

The binary image data, read from the original image by the image reader unit 624, is transmitted to the isolated dot detection unit 400. The isolated dot detection unit 400 detects the presence of an isolated pixel contained in a "dl" block (see FIG. 4(b)), which is composed of "d" pixels along the main scanning direction and "l" lines along the sub-scanning direction, in the input binary image data (where "d" and "l" are positive integers above one). The result of detection of isolated pixels is transmitted to the phase information storage unit 401 together with the input image data.

Based on the result of detection of isolated pixels received from the isolated dot detection unit 400, the phase information storage unit 401 stores the position information of the isolated pixels contained in a "BdxLl" block (see FIG. 4(c)), which is composed of "Bd" pixels (where "B" is a positive integer above two) along the main scanning direction which are equivalent to the number of pixels "B" times the "d" pixels, and "Ll" lines (where "L" is a positive integer above two) along the sub-scanning direction which are equivalent to the number of lines "L" times the "l" lines.

The pattern matching unit 402 performs matching processing of the position information of the isolated pixels within the "BdxLl" block stored by the phase information storage unit 401, and a predetermined ground-tint pattern which is stored beforehand (see FIG. 4(d)). The result of the matching processing is transmitted from the pattern matching unit 402 to the ground tint detection unit 403.

When the isolated pixels on the sub-scanning line match with "n" or more predetermined ground-tint patterns, the ground tint detection unit 403 determines that a ground-tint pattern is formed in the original image. The ground tint detection unit 403 outputs a detection signal indicating the result of the detection of a ground-tint pattern, to the image reader unit 624.

In order to appropriately perform the detection of isolated pixels by the isolated dot detection unit 400 and the matching processing by the pattern matching unit 402, it is necessary that the reading resolution of the image reader unit 624 when performing image reading is set up to be higher than a minimum resolution needed for the ground tint detection.

If the reading resolution of the image reader unit 624 should be lower than the minimum resolution needed for the ground tint detection, the isolated dot detection unit 400 cannot suitably detect an isolated pixel and the pattern matching unit 403 cannot suitably perform the matching processing.

In this embodiment, when detecting the ground-tint pattern by the ground tint detection unit 635, a predetermined minimum resolution needed for the detection of a ground-tint pattern is stored in the RAM 603 as the reading resolution used for the image reader unit 624 when reading an original image.

Next, the difference in outputting an reproduced image between when reading the special original in which a ground-tint pattern is formed, and when reading the normal original in which no ground-tint pattern is formed, by using the image forming device in an embodiment of the invention will be explained with reference to FIG. 7 and FIG. 8.

Figure 7:
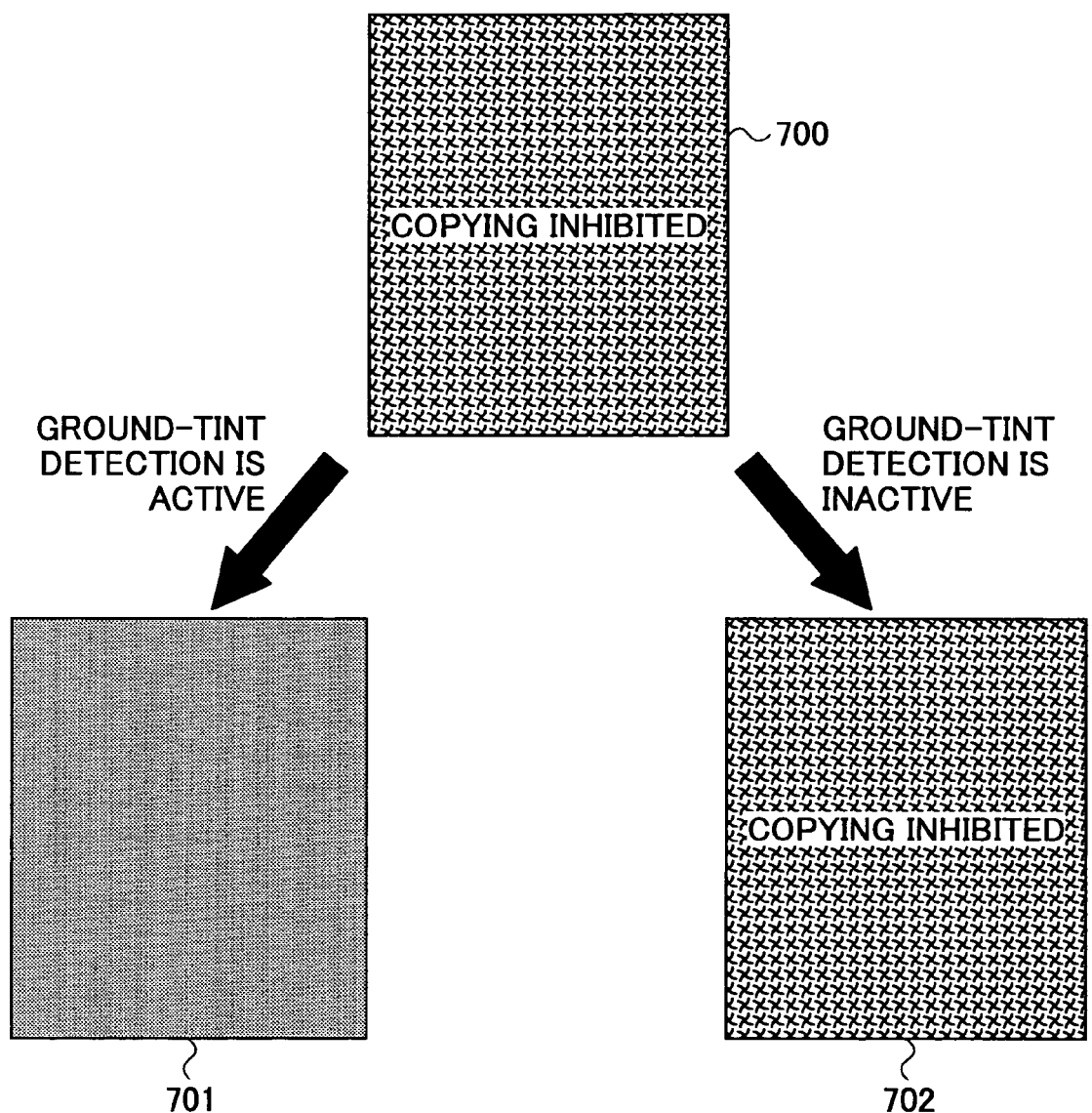
FIG. 7 is a diagram showing an example of a copy sheet outputted by the image forming device in an embodiment of the invention when a special original is read.

In the left-hand case of FIG. 7, suppose that the user sets up the image forming device so that it performs the detection processing of a ground-tint pattern by the ground tint detection unit 635 (ground tint detection is active). When the special original 700 in which a ground-tint pattern is formed is read, the processed image data that makes the contents of the original image illegible is transmitted to the image writer unit 623, and such image is outputted to the copy sheet 701. Therefore, the formation of a reproduced image of the special original 700 can be prevented.

On the other hand, in the right-hand case of FIG. 7, suppose that the user sets up the image forming device so that it does not perform the detection processing of a ground-tint pattern by the ground tint detection unit 635 (ground tint detection is inactive). When the special original 700 in which a ground-tint pattern is formed is read, the image in which the ground-tint pattern is formed similar to the original image is outputted to the copy sheet 702.

Figure 8:
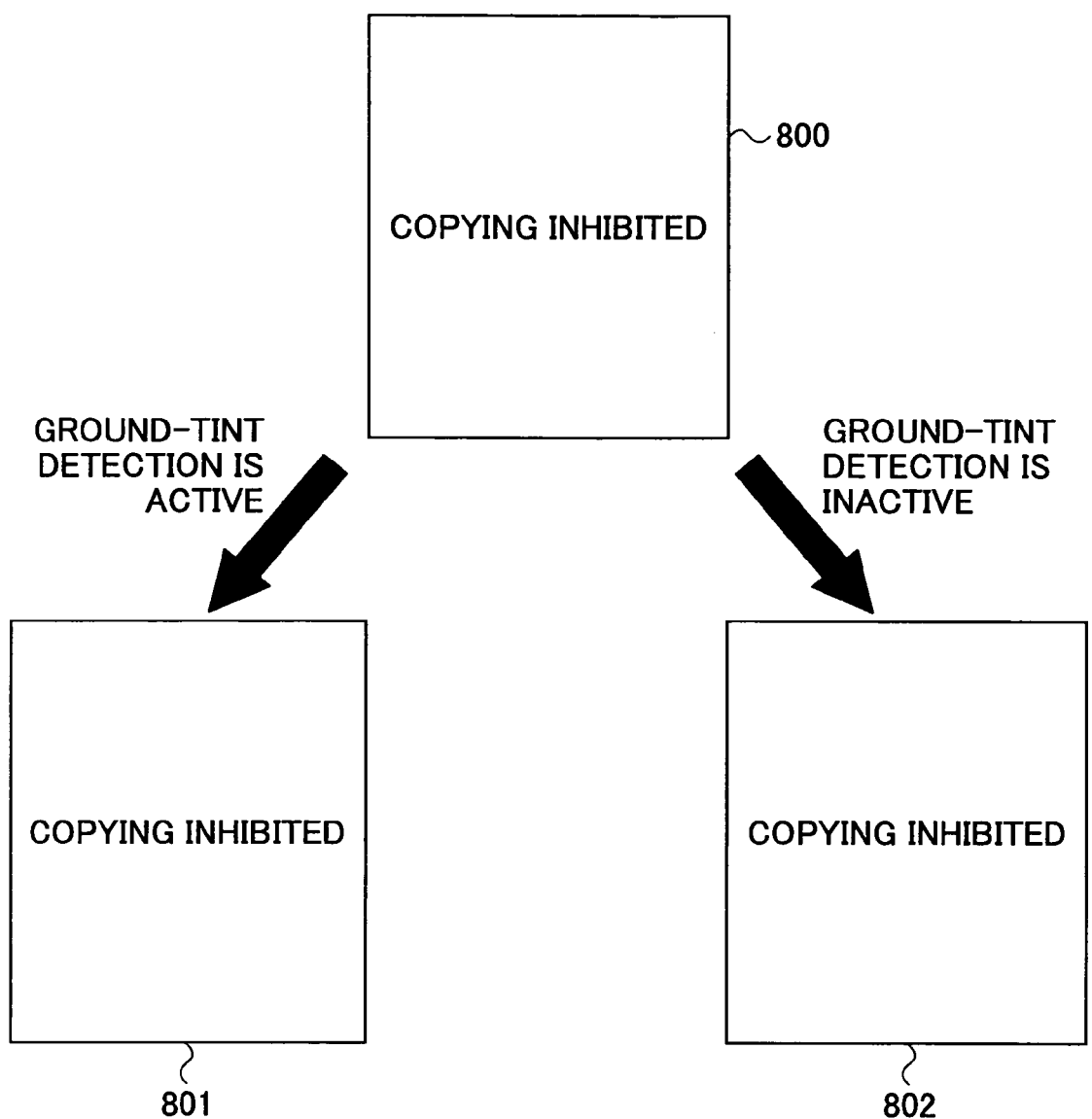
FIG. 8 is a diagram showing an example of a copy sheet outputted by the image forming device in an embodiment of the invention when a normal original is read.

In the left-hand case of FIG. 8, suppose that the user sets up the image forming device so that it performs the detection processing of a ground-tint pattern by the ground tint detection unit 635 (ground tint detection is active). When the normal original 800 in which no ground-tint pattern is formed is read, any ground-tint pattern is not detected in the original image, the image which is the same as the original image is outputted to the copy sheet 801.

On the other hand, in the right-hand case of FIG. 8, suppose that the user sets up the image forming device so that it does not perform the detection processing of a ground-tint pattern by the ground tint detection unit 635 (ground tint detection is inactive). When the normal original 800 in which no ground-tint pattern is formed is read, the image which is the same as the original image is outputted to the copy sheet 801.

Next, the composition of an image forming system in which the image forming device in an embodiment of the invention is connected to an image reader, an information processing terminal, and another image forming device which are interconnected by a network will be explained with reference to FIG. 5.

Figure 5:
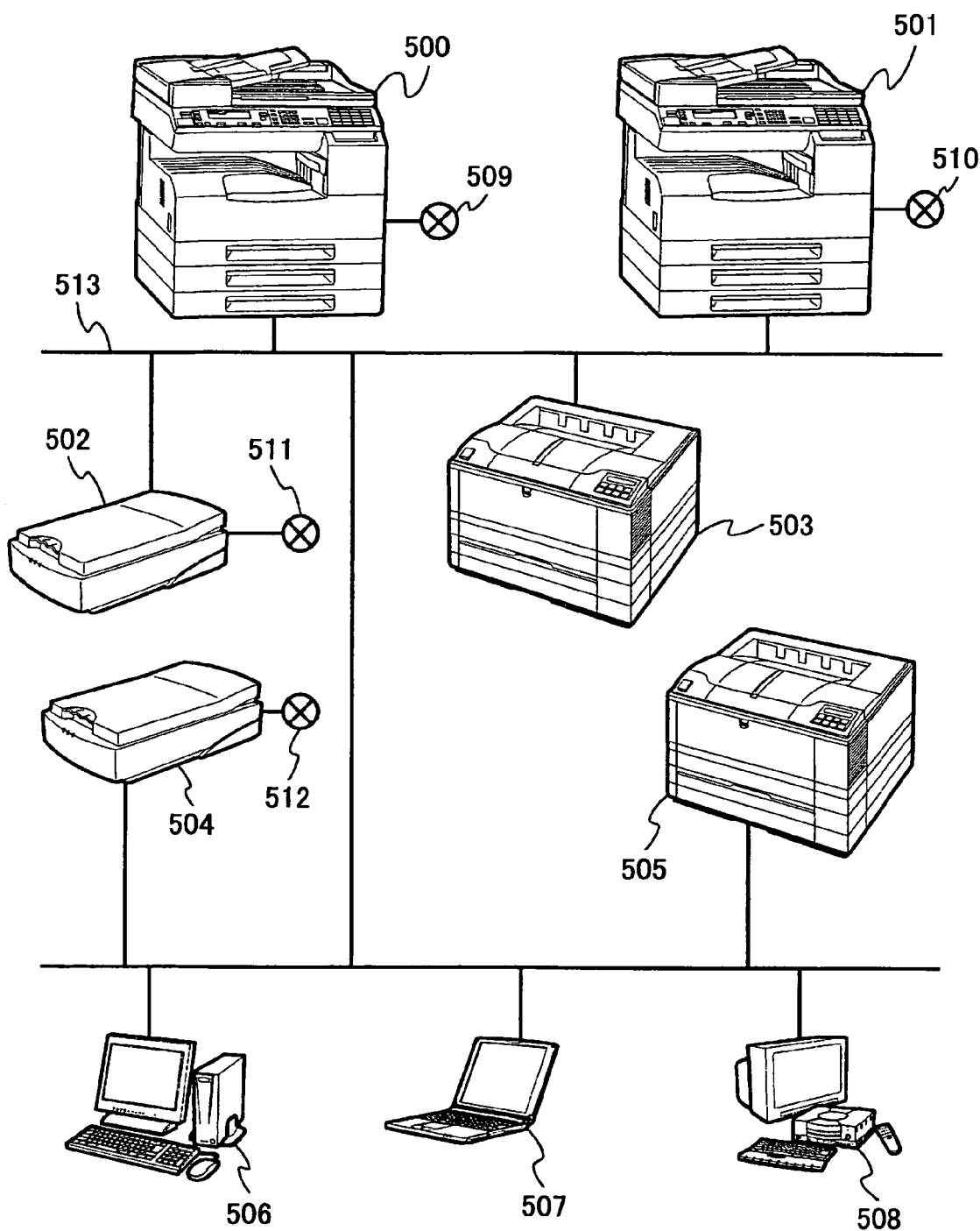
FIG. 5 is a diagram showing the composition of an image forming system when the image forming device in an embodiment of the invention is connected to a network.

In the example of FIG. 5, suppose the case in which the image forming device of the above-mentioned embodiment is applied to a digital copier 500. However, it is also possible to apply the image forming device of the above-mentioned embodiment to a digital copier 501, an image reader 502 or 504, or a printer 503 or 505.

As shown in FIG. 5, the digital copier 500 is connected with the digital copier 501, the image readers 502 and 504, the printers 503 and 505, and the information processing terminals 506, 507 and 508 via the network 513, respectively, so that bi-directional communications are possible.

The digital copiers 500, 501 and the scanner devices 502, 504 are provided to transmit the read image directly to the public telephone network lines 509, 510, 511, and 512 as facsimile image data.

The digital copiers 500, 501, the scanner devices 502, 504, and the printers 503, 505 are provided to communicate with each other bidirectionally via the network 513, and they can transmit and receive image data.

The information processing terminals 506, 507, 508 are provided to operate the digital copiers 500, 501, the scanner devices 502, 504, and the printers 503, 505 which are connected to the network 513. The information processing terminals 506, 507, 508 are provided to perform transmission, reception and storage of image data at each of the above-mentioned nodes.

For example, when the ground-tint pattern is formed in the original image read by the digital copier 500, the ground tint detection unit 635 of the digital copier 500 detects the presence of the ground-tint pattern formed in the original image. And the image reader unit 624 of the digital copier 500 creates the processes image data that makes the contents of the original image illegible.

Accordingly, even if the processed image data from the digital copier 500 is transmitted via the network 513 to any node of the digital copier 501, the image readers 502, 504, the printers 503, 505, and the information processing terminals 506, 507, 508, leakage of confidential information included in the original can be prevented.

Next, a procedure of setting the reading resolution of the image reader unit 624 which is performed at the time of startup of the image forming device in an embodiment of the invention will be explained with reference to FIG. 10.

Figure 10:
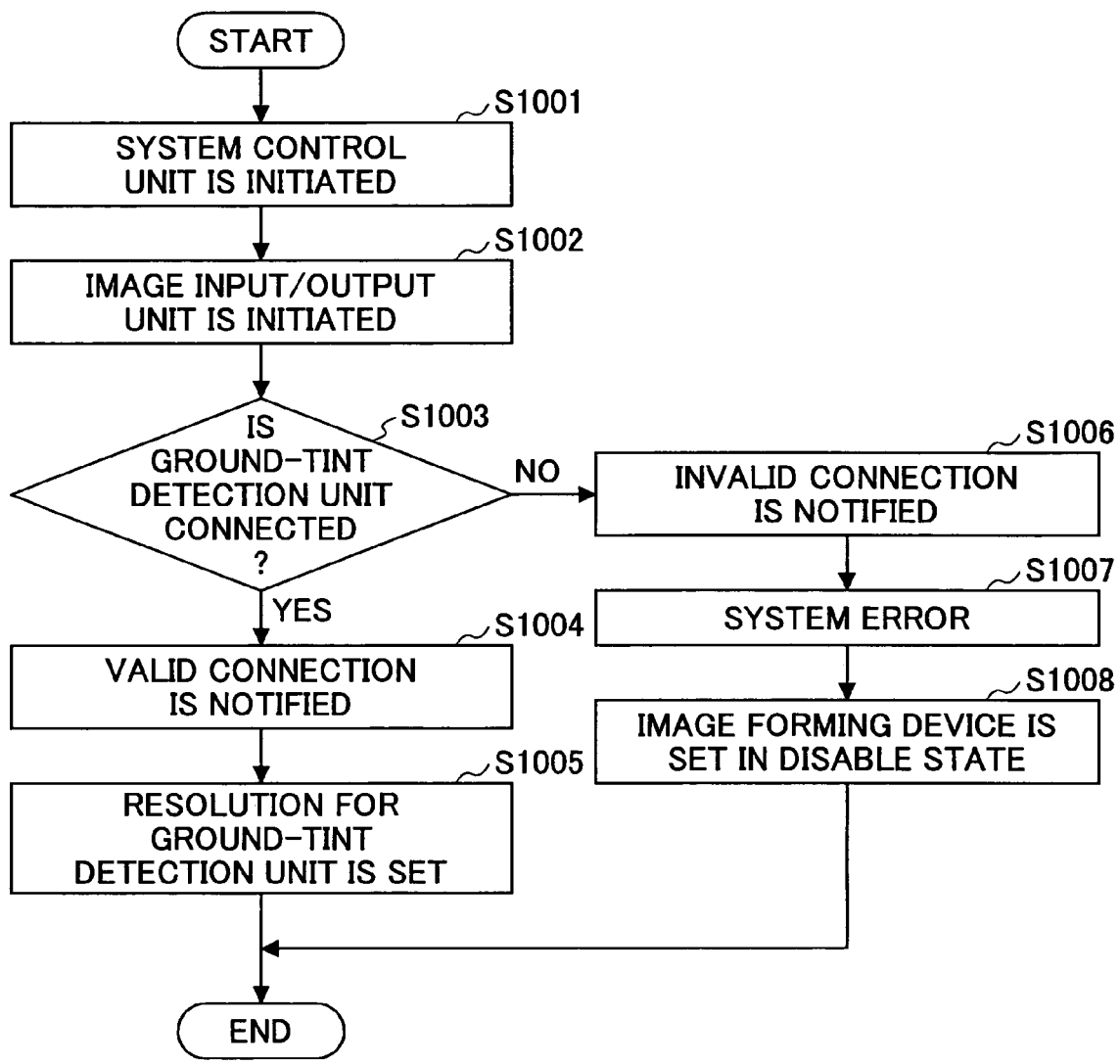
FIG. 10 is a flowchart for explaining a procedure of setting a reading resolution of an image reader unit which is performed at the time of startup of the image forming device.

As shown in FIG. 10, when the power switch of the image forming device is turned on, the system control unit 630 is initiated (step S1001). The CPU 605 initiates the image input/output unit 632 (step S1002).

Next, the CPU 605 detects whether the ground tint detection unit 635 is connected to the image input/output unit 632 (step S1003).

When the ground tint detection unit 635 is connected, the CPU 605 receives a notice which indicates that the ground tint detection unit 635 is connected validly, from the image input/output unit 632 (step S1004).

When the notice which indicates the valid connection of the ground tint detection unit 635 is received, the CPU 605 stores the minimum reading resolution needed for ground-tint detection into the RAM 603, and allows the reading resolution of the image reader unit 624, at which image reading of an original image is performed by the image reader unit 624, to be higher than the stored resolution of the RAM 603 (step S1005).

When the ground tint detection unit 635 is not connected validly, the CPU 605 receives a notice which indicates that the ground tint detection unit 635 is not connected to the image input/output unit 632 validly (step S1006).

If the notice which indicates the invalid connection of the ground tint detection unit 635 is received, the CPU 605 determines that a system error arises (connection error of the image input/output unit 632) (step S1007). The CPU 605 sets the image input/output unit 632 in a disable state and inhibits use of the image forming device (step S1008).

Next, another operation of setting the reading resolution of the image reader unit 624 which is performed at the time of startup of the image forming device in an embodiment of the invention will be explained with reference to FIG. 11.

Figure 11:
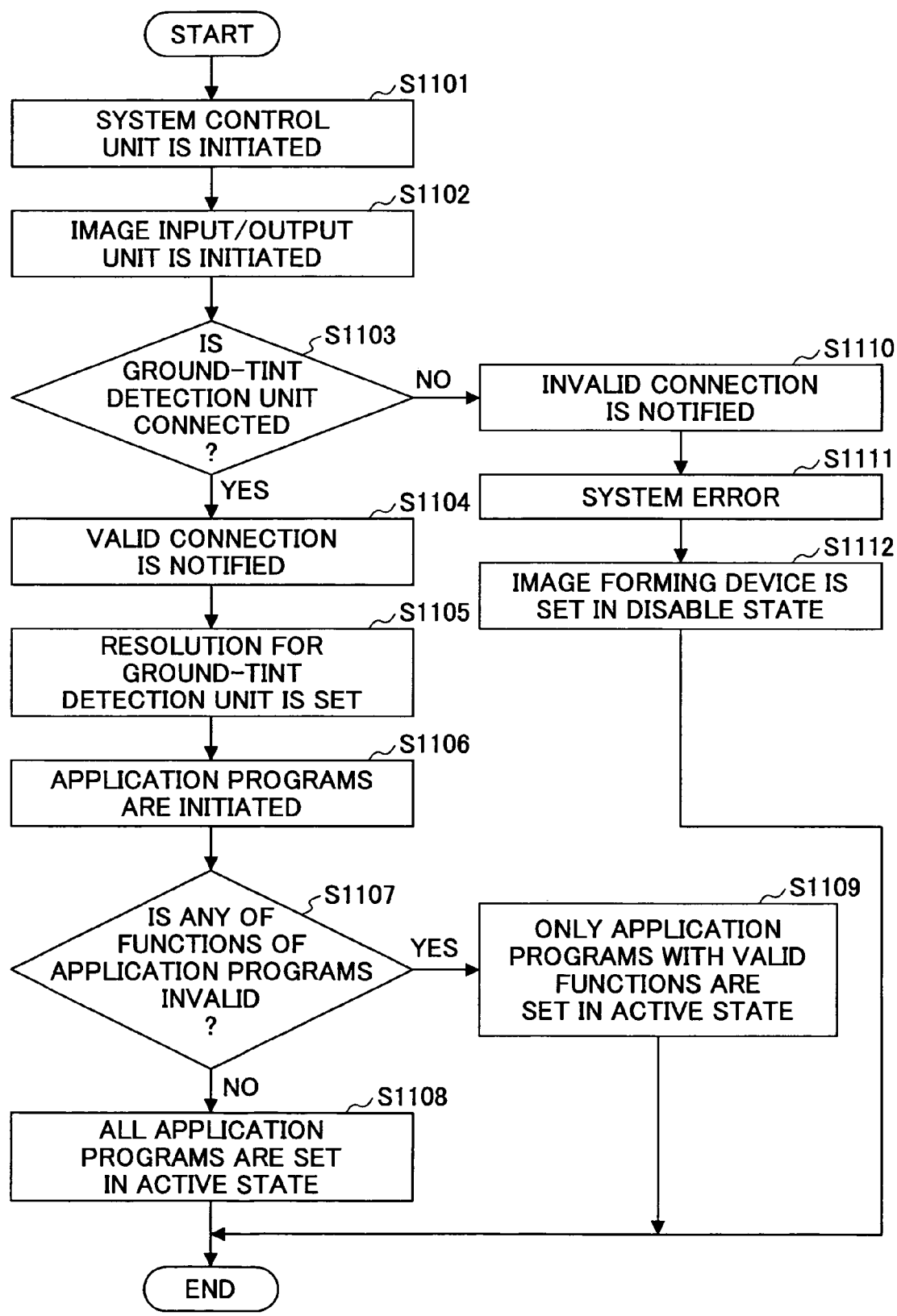
FIG. 11 is a flowchart for explaining another procedure of setting a reading resolution of the image reader unit which is performed at the time of startup of the image forming device.

As shown in FIG. 11, when the power switch of the image forming device is turned on, the system control unit 630 is initiated (step S1101). The CPU 605 initiates the image input/output unit 632 (step S1102).

Next, the CPU 605 detects whether the ground tint detection unit 635 is connected to the image input/output unit 632 (step S1103).

When the ground tint detection unit 635 is connected, the CPU 605 receives a notice which indicates that the ground tint detection unit 635 is connected validly, from the image input/output unit 632 (step S1104).

When the notice which indicates the valid connection of the ground tint detection unit 635 is received, the CPU 605 stores the minimum reading resolution needed for ground-tint detection into the RAM 603 (S1105). This step S1105 allows the image reader unit 624 to perform image reading at a reading resolution higher than the stored resolution of the RAM 603.

When the resolution is stored in the RAM 603, the CPU 605 initiates the application programs, such as scanner application, copy application, facsimile application, and printer application, by reading them from the ROM 604 and loading them to the RAM 603 (step S1106).

Next, the CPU 605 determine whether there is any application program the image formation function of which does not work normally at the stored resolution of the RAM 603 (step S1107).

For example, the image forming device has a facsimile application program, and if an effective resolution which can be detected by the facsimile application program is lower than the stored resolution of the RAM 603, it is determined that the image formation function of the facsimile application program does not work normally. In this case, since an original image cannot be normally read by using the facsimile application program, a facsimile function cannot be used in the image forming device.

For this reason, when there is an application program whose image formation function does not work normally at the stored resolution of the RAM 603, the CPU 605 registers only the initiation-related identification data of application programs with valid functions, other than the detected application program with invalid function, in the RAM 603 (step S1109).

In this case, with respect to the image formation function of the detected application program with which the initiation-related. identification data is not registered in the RAM 603, the detection of a ground-tint pattern at the time of image reading is not performed. Alternatively, the CPU 605 may inhibit use of the detected application program with which the initiation-related identification data is not registered in the RAM 603. Therefore, illegal outputting of image data of a special original can be prevented more effectively.

When there is no application program whose image formation function does not work normally at the stored resolution of the RAM 603, the CPU 605 registers the initiation-related identification data of all the application programs in the RAM 603 (step S1108). In this case, when image reading is performed, the reading of image data is performed at the stored resolution of the RAM 603 with respect to the image formation functions of all the application programs.

On the other hand, when the ground tint detection unit 635 is not connected validly, the CPU 605 receives a notice which indicates invalid connection of the ground tint detection unit 635, from the image input/output unit 632 (step S1110).

If the notice which indicates the invalid connection of the ground tint detection unit 635 is received, the CPU 605 determines that a system error arises (connection error of the image input/output unit 632) (step S1111). The CPU 605 sets the image input/output unit 632 in a disable state and inhibits use of the image forming device (step S1112).

Next, the procedure to activate the detection processing of the ground tint detection unit 635 at the time of image reading which is performed in response to input of an administrator (or user) of the image forming device will be explained with reference to FIG. 9.

Figure 1:
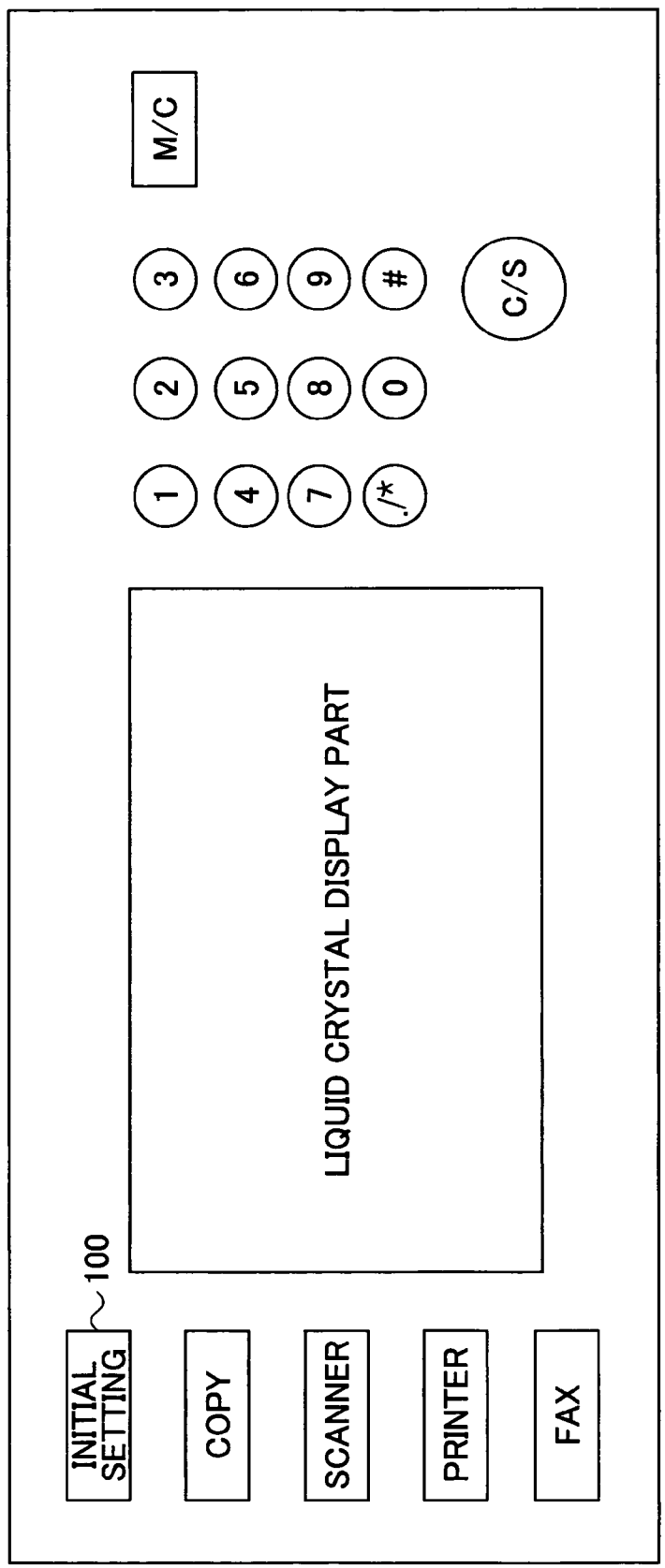
FIG. 1 is a diagram showing an example of an input device of an image forming device in an embodiment of the invention.
Figure 9:
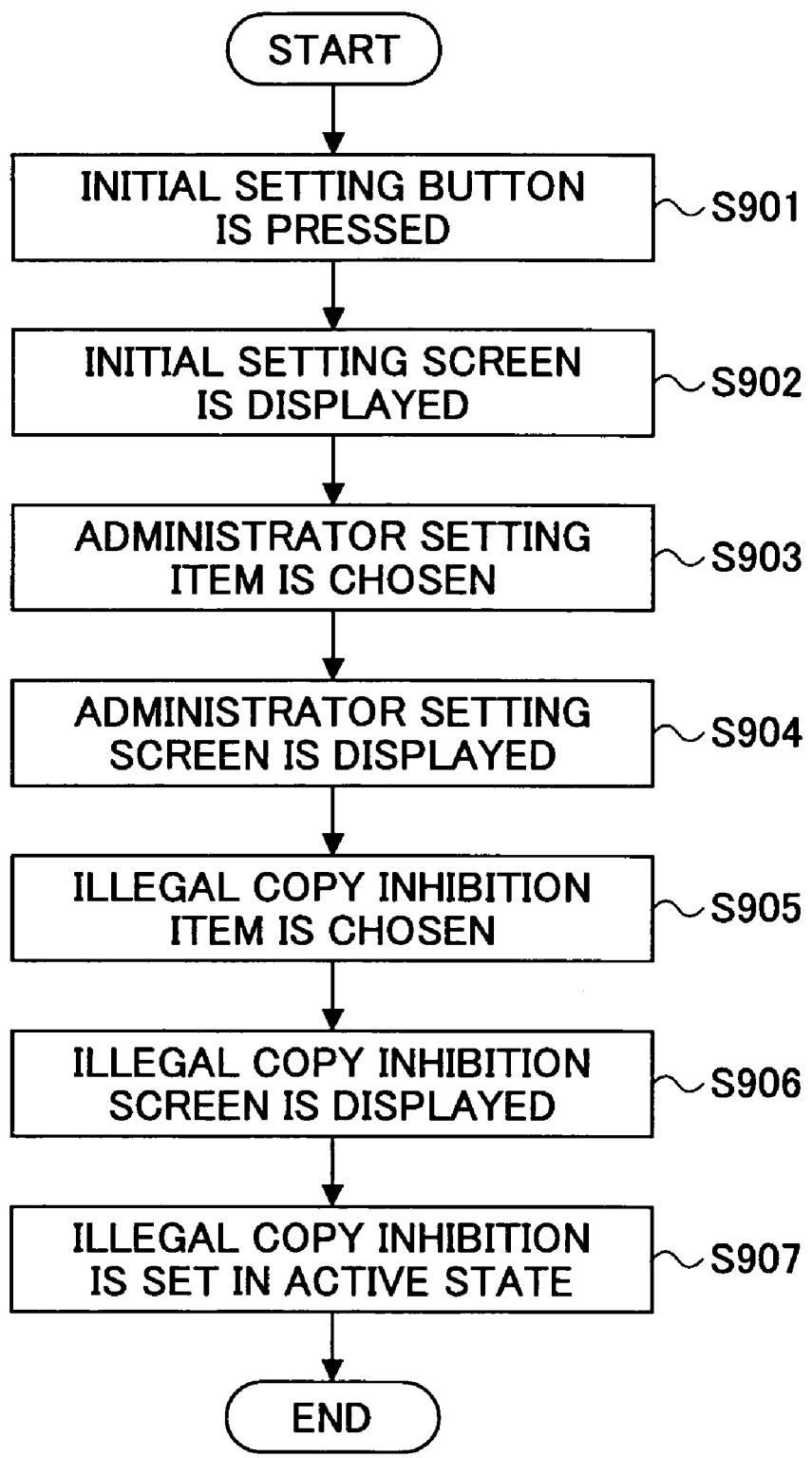
FIG. 9 is a flowchart for explaining a procedure to activate detection processing of the ground-tint detection unit which is performed in response to input of an administrator of the image forming device.

As shown in FIG. 9, when the administrator (or user) of the image forming device presses an initial-setting button 100 of the input device 614 which is shown in FIG. 1 (step S901), an initial-setting screen is displayed on the display device 615 (step S902).

Figure 2:
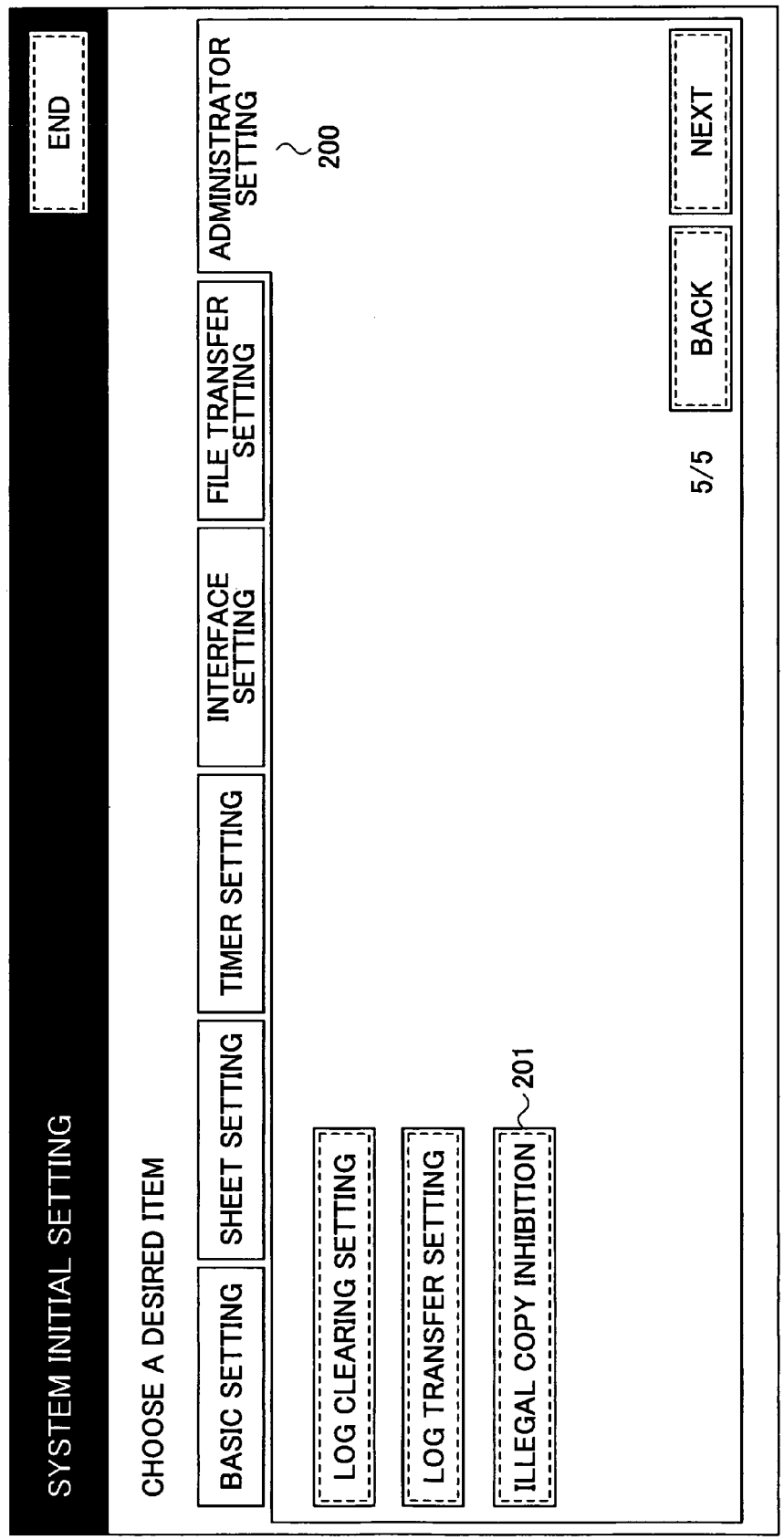
FIG. 2 is a diagram showing an example of an administrator setting screen displayed on a display device of the image forming device.

When an administrator setting button 200 is chosen from the initial-setting screen (step S903), an administrator setting screen which is shown in FIG. 2 is displayed (step S904).

Figure 3:
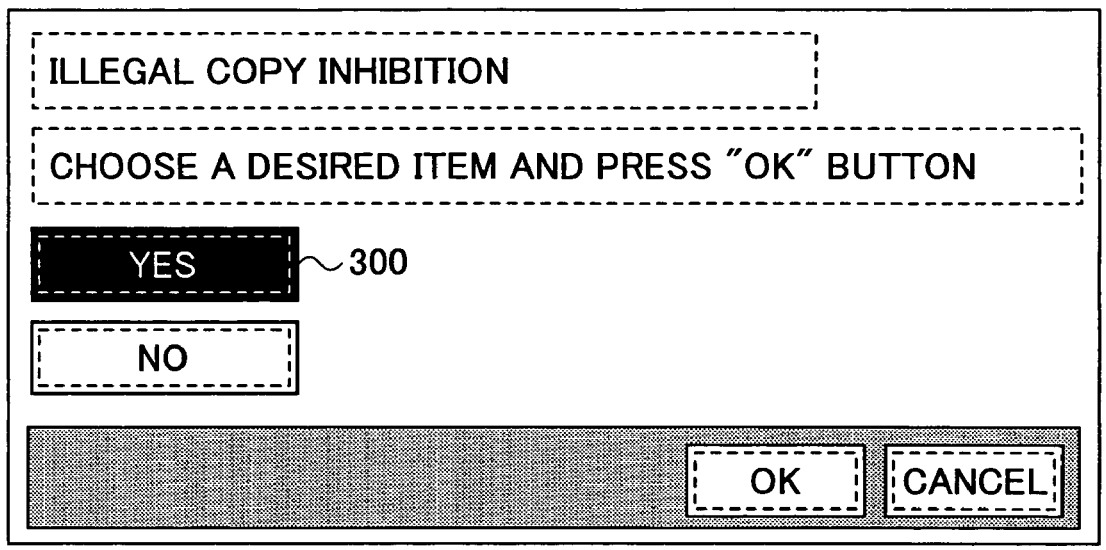
FIG. 3 is a diagram showing an example of an illegal copy inhibition screen displayed on the display device of the image forming device.

When an illegal copy inhibition button 201 is chosen from the administrator setting screen (step S905), the illegal copy inhibition screen which is shown in FIG. 3 is displayed (step S906).

If the "YES" button 300 is chosen from the illegal copy inhibition screen, the detection processing of a ground-tint pattern by the ground tint detection unit 635 at the time of image reading is set in an active state (step S907)

Alternatively, the administrator's authentication processing may be performed before the administrator sets the detection processing of a ground-tint pattern in an active state in the procedure of FIG. 9. This alternative procedure makes it possible to prevent alternation of the setting of the image forming device by the third party.

Similar to the procedure of FIG. 9, the alternative procedure to activate the detection processing of the ground tint detection unit 635 at the time of image reading which is performed in response to input of the administrator (or user) of the image forming device will be explained with reference to FIG. 12.

Figure 12:
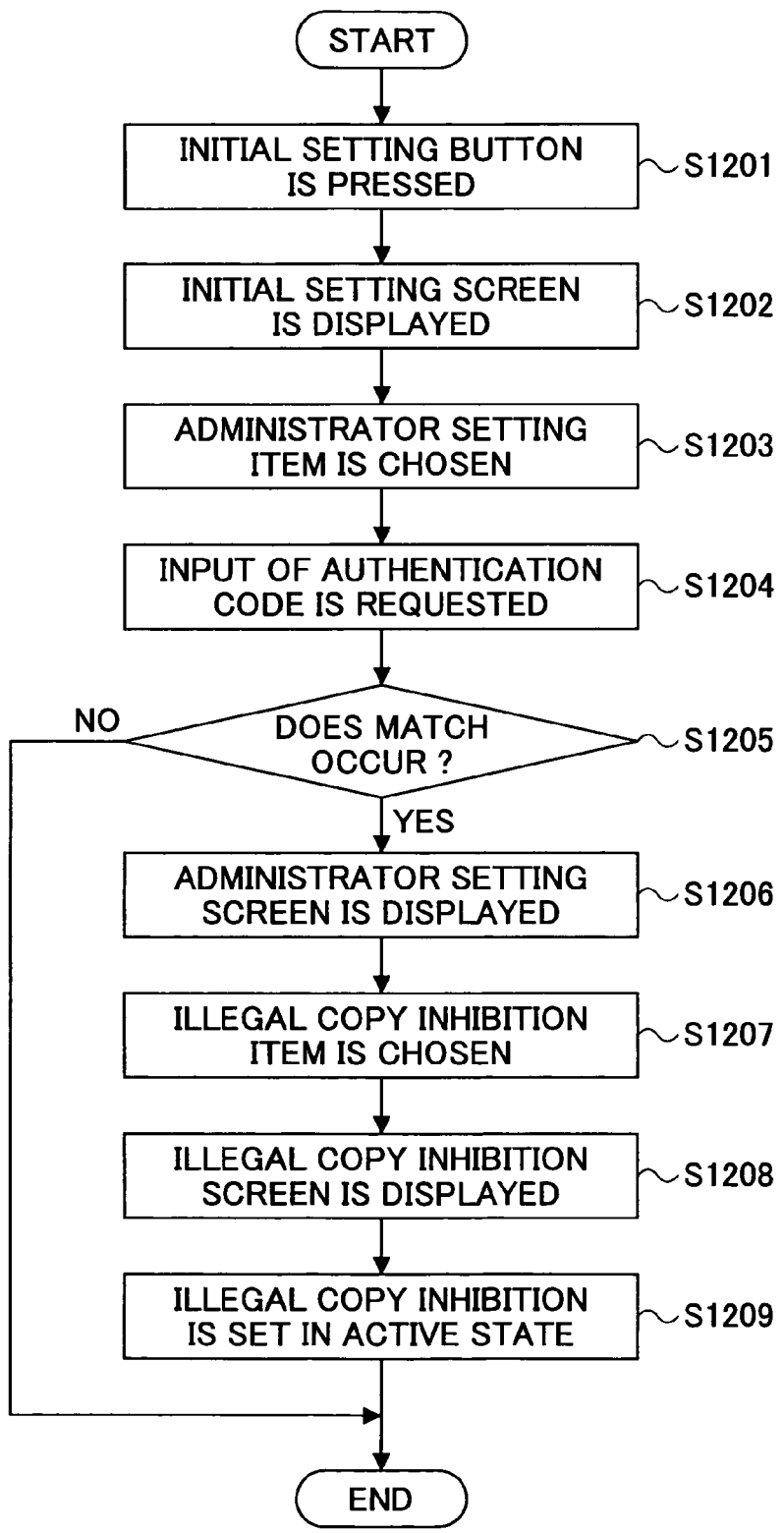
FIG. 12 is a flowchart for explaining another procedure to activate the detection processing of the ground tint detection unit which is performed in response to input of an administrator of the image forming device.

In the procedure of FIG. 12, the steps S1201 to S1203 and the steps S1206 to S1209 are the same as the steps S901 to S903 and the steps S904 to S907 in the procedure of FIG. 9, respectively, and a description thereof will be omitted.

As shown in FIG. 12, when the administrator setting button 200 is chosen from the initial-setting screen (step S1203), a screen which requests the administrator to input his administrator information (administrator ID and authentication code), which is shown in FIG. 13, is displayed (step S1204).

If the administrator ID and the authentication code are inputted from the input device 614, the CPU 617 reads the administrator ID and the authentication code (shown in FIG. 14) which are registered in the RAM 618, and checks them with the input administrator ID and the input authentication code, and it is determined whether a match occurs (step S1205).

When a match between the administrator ID and the authentication code read from the RAM 618 and the input administrator ID and the input authentication code occurs, the administrator setting screen shown in FIG. 2 is displayed on the display device 615 (step S1206).

On the other hand, when no match arises, it is determined that unjust use of the image forming device is attempted by a third person other than the administrator. The procedure for activating or deactivating the detection of a ground-tint pattern is forced to terminate.

According to the above-described image forming device, the image reader unit is allowed to read a special original containing a ground-tint pattern therein at a resolution high than the minimum resolution needed for ground-tint detection. And illegal outputting of image data of a special original can be prevented by detecting the ground-tint pattern in the original image safely.

Moreover, according to the above-described image forming device, when an application program the image formation function of which does not work normally at the stored resolution of the RAM 603 is detected, only the initiation-related identification data of application programs with valid functions, other than the detected application program with invalid function, are registered in the RAM 603. Accordingly, illegal outputting of image data of a special original can be prevented more effectively.

Moreover, only the administrator or user of the image forming device is permitted to alter ON/OFF setting of the ground tint detection unit, and it is possible to prevent alteration of the original setting of the detection processing of the ground tint detection unit by the third party.

The present invention is not limited to the above-described embodiments, and variations and modifications may be made without departing from the scope of the present invention.

Further, the present application is based on and claims the benefit of priority of Japanese patent application No. 2004-350096, filed on Dec. 2, 2004, and Japanese patent application No. 2005-338560, filed on Nov. 24, 2005, the entire contents of which are hereby incorporated by reference.

What is claimed is:

1. An image forming device comprising:
    an image reader unit reading an original image to output image data of the original image;
    a ground-tint detection unit detecting a ground-tint pattern in the original image based on the image data output from the image reader unit, the ground-tint pattern being provided to inhibit outputting of the image data of the original image;
    a memory unit in which a minimum resolution that is needed for detection of a ground-tint pattern by the detection unit is stored;
    an image invalidation unit outputting a processed image data that makes the image data of the original image illegible, when the ground-tint pattern in the original image is detected; and
    a resolution setting unit storing the minimum resolution into the memory unit and allowing a resolution of the image reader unit at which the original image is read, to be higher than the minimum resolution stored in the memory unit.

2. The image forming device according to claim 1 further comprising:
    a connection detection unit detecting whether the ground-tint detection unit is connected to the image forming device; and
    an inhibiting unit inhibiting use of the image forming device when the connection detection unit detects that the ground-tint detection unit is not connected to the image forming device.

3. The image forming device according to claim 1 further comprising:
    an application storing unit reading a plurality of application programs from the image forming device and loading all the plurality of application programs to the memory unit; and
    a function detection unit detecting whether there is any application program among the plurality of application programs, which does not function normally with the minimum resolution stored in the memory unit.

4. The image forming device according to claim 1 further comprising a setting unit setting, in response to an input of a user, the detection of the ground-tint pattern by the ground-tint detection unit in either an active state or an inactive state.

5. The image forming device according to claim 4 further comprising:
    a holding unit holding identification codes and authentication codes for a group of users;
    an input request unit requesting a user of the image forming device to input an identification code and an authentication code of the user; and
    a checking unit determining whether the identification code and the detection code inputted by the user of the image forming device match with one of the identification codes and the authentication codes held by the holding unit,
    wherein the user of the image forming device is permitted to change a setting of the detection of the ground-tint pattern by the ground-tint detection unit, according to a result of the determination of the checking unit.

6. The image forming device according to claim 1 wherein the ground-tint detection unit comprises:
    a pixel detection unit detecting isolated pixels in the image data;

a position information storage unit storing position information of the isolated pixels detected by the pixel detection unit;

a pattern matching unit performing matching processing of the position information of the isolated pixels stored by the position information storage unit and predetermined ground-tint patterns; and a decision unit determining whether a ground-tint pattern is contained in the original image, based on a result of the matching processing.

7. The image forming device according to claim 3 further comprising a registration unit registering only application programs other than the application program which does not function normally when the function detection unit detects that there is the application program which does not function normally.

8. The image forming device according to claim 3 further comprising a registration unit registering all the plurality of application program loaded by the application storing unit when the function detection unit detects that there is no application which does not function normally.

* * * * *